Jan. 26, 1943   E. C. HORTON   2,309,613
FRICTION SECURING DEVICE
Filed July 18, 1940
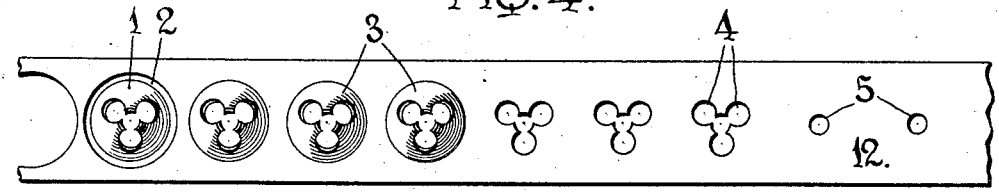
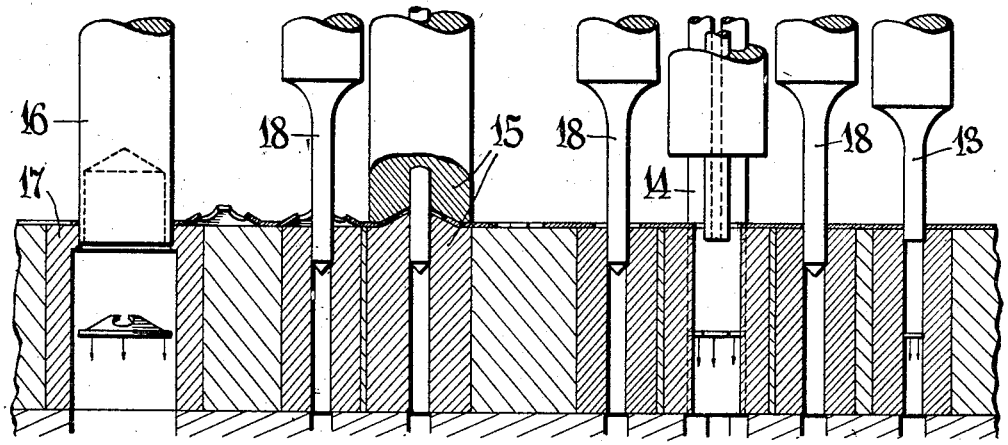
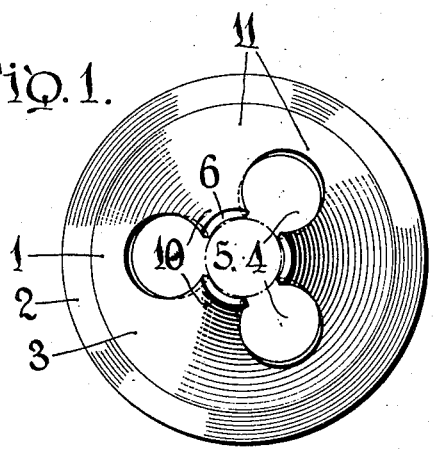
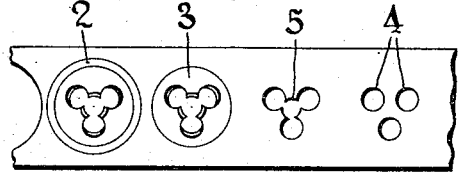
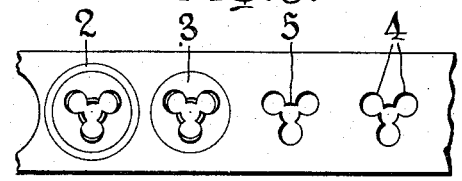
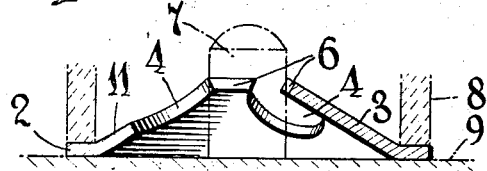
INVENTOR
Erwin C. Horton,
BY
Beau, Brooks, Buckley & Beau.
ATTORNEYS Patented Jan. 26, 1943

2,309,613

UNITED STATES PATENT OFFICE 2,309,613

FRICTION SECURING DEVICE

Erwin C. Horton, Hamburg, N. Y., assignor to Trico Products Corporation, Buffalo, N. Y.

Application July 18, 1940, Serial No. 346,168

6 Claims. (Cl. 85—36)

This invention relates to a fastener and a method of making the same and it has for its primary object to provide a fastening device of simple design which may readily be stamped and shaped by simple operations and which when applied to a stud or shank will effectively secure itself thereto against unauthorized displacement.

Fasteners of this general type have heretofore been designed but have necessitated the removal of excess material by specially constructed dies. The present invention utilizes simple punch operations in producing a fastener which is strong and effective as a securing device.

Fig. 1 is a plan view of the improved fastener embodying the present invention;

Fig. 2 is a cross section therethrough with the dotted lines indicating the manner of applying the fastener to a stud or shank;

Fig. 3 is a longitudinal section showing schematically the several punch operations in the production of the fastener;

Fig. 4 is a fragmentary section of a strip of stock material showing the successive steps in the formation of the fastener;

Figs. 5 and 6 are views similar to Fig. 4 in which the order or sequence of operations have been slightly altered.

Referring more particularly to the drawing, the numeral 1 designates the improved fastener, the same being herein depicted as of circular shape and having a flat marginal or peripheral base 2 with a central portion 3 of substantially truncated conical formation. This central portion is provided with a circular series of openings 4, three being illustrated, and these openings are interconnected by an axial or central opening 5 which results in a composite hole of lobate or scalloped design, having edges 6 intervening the openings 4.

The openings 4 and 5 are preferably round, being more economically formed as such, and consequently the edges 6 will be arcuate in extent and may be conformed to the round stud or shank 7, in Fig. 2, for more effective securement. The fastener is conveniently applied to the stud by exerting pressure on the base 2, as through a tubular tool 8 which causes the annular base to seat upon the body 9 from which the stud 7 projects.

The circular shape of the openings 4 results in the formation of radially disposed fingers 10 which flare inwardly toward the stud receiving opening 5 and give substantial support to their arcuate stud engaging seats or edges 6. The opening 5 is preferably punched before the central portion is given its conical shape, so that when this shape is imparted the lower corner of the arcuate edge will be disposed to provide a biting part to firmly engage or embed itself into the stud 7, as shown in Fig. 2. The openings 4 are spaced inwardly from the marginal base 2 so as to provide a solid and continuous conical section 11 for supporting and connecting the fingers 10 and thereby afford added strength to them. By reason of the cone shape the gripping fingers are also bowed transversely to reduce their flexibility and render their stud engagement more secure. The openings provide ample clearance to insert a tool for disengaging the fingers when it becomes necessary to remove the fastener.

Referring more particularly to Figs. 3 and 4 a strip of stock material 12 is fed through a punch machine. Preferably, the strip is first formed with the central opening 5 by a punch 13 and then the circularly arranged openings 4 are produced by the tri-punch member 14. Thereafter the central portion 3 is given its conical shape by forming dies 15 aund finally the completed fastener is struck from the strip by the punch 16 and its cooperating die 17. Intermediate these operations suitable pilot members 18 are provided to maintain the strip 12 in proper alignment.

Fig. 5 illustrates a sequence of steps wherein the circular series of openings 4 are initially formed and subsequently joined by the central opening 5. Or if it is desired to go to the expense of making a single punch of trilobate or otherwise multilobate design the scalloped hole may be punched in a single operation, as depicted in Fig. 6, and this followed by the conical shaping of the central portion.

From the foregoing it will be observed that the several steps of the method comprise simple punching and shaping operations; that the resulting fastener is strong and durable; and that while the description has been given in much detail, it has been so stated to illustrate the inventive principles involved and not by way of restriction to the scope and spirit defined in the appended claims.

What is claimed is:

1. A separable fastener having a truncated conical body with the upper side portion thereof interrupted by circular openings defining upwardly flaring shank gripping parts, the openings being arranged wholly within the conical body and short of the base of the cone.

2. A separable fastener having a truncated conical body with the sides thereof interrupted by circular openings defining shank gripping parts each with its upper extremity widening toward a shank engaging edge.

3. A fastener having a marginal base and an upwardly extending central conical portion with a shank receiving opening defined by inwardly extending parts formed with shank gripping seats of arcuate form concentrically related, said parts being separated by circular openings, the adjacent seats being formed by a central opening intersecting the circular openings in their upper arcs thereby to impart an upward flare to the parts in the conical portion.

4. A fastener having a conical portion uninterrupted at its lower edge and having its upper edge defined by upwardly extending fingers transversely bowed in conformity with the conical shape, the upper extremities of the fingers defining a central stud receiving opening with the opening defining walls of the upper edges being flared outwardly to present the lower corners of the edges for biting engagement with a received stud.

5. A fastener adapted to be applied to a shank by axial movement thereover, comprising a body of hollow truncated conical shape having its upper periphery interrupted by a plurality of openings forming a plurality of shank gripping parts therebetween, said shank gripping parts provided with wide shank gripping edges each supported by a relatively narrowed neck to provide a resilient support for the gripping edge whereby the shank gripping part may yield outwardly from the side of the conical body in passing over the end of a shank when applied thereto.

6. A fastener adapted to be applied to a shank by axial movement thereover, comprising a body of truncated conical shape having its upper periphery divided into a plurality of shank gripping fingers by a plurality of openings, each finger having a shank engaging edge supported by a narrowed flexible neck portion of the body of less width than the shank engaging edge whereby the finger may flex outwardly from the side of the conical body in passing over the end of the shank, said body having a flanged base portion extending uninterrupted partially up the sides of the cone to a plane from which the neck portions originate to support the relatively wider gripping edge.

ERWIN C. HORTON.